No. 674,738. Patented May 21, 1901.
G. T. MILLS.
VETERINARY SURGICAL INSTRUMENT.
(Application filed Sept. 27, 1900.)
(No Model.)
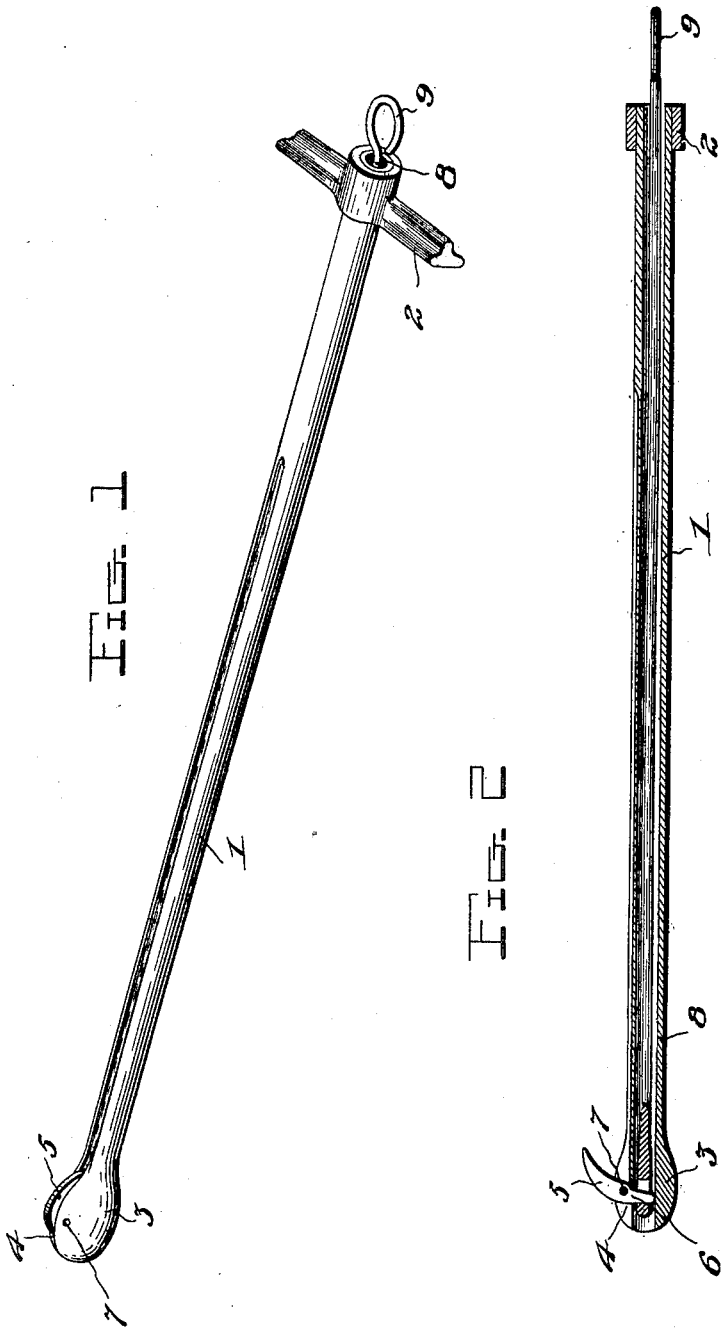

UNITED STATES PATENT OFFICE.

GEORGE T. MILLS, OF SUPERIOR, NEBRASKA.

VETERINARY SURGICAL INSTRUMENT.

SPECIFICATION forming part of Letters Patent No. 674,738, dated May 21, 1901.

Application filed September 27, 1900. Serial No. 31,264. (No model.)

*To all whom it may concern:*

Be it known that I, GEORGE THOM MILLS, a citizen of the United States, residing at Superior, in the county of Nuckolls and State of Nebraska, have invented certain new and useful Improvements in Veterinary Surgical Instruments; and I do declare the following to be a full, clear, and exact description of the invention, such as will enable others skilled in the art to which it appertains to make and use the same.

My invention relates to an improved veterinary surgical instrument designed for use as a pig-extractor.

The object of the invention is to provide a simple, inexpensive, and effective device of this character which may be used without injury to the sow and little or no injury to the pig, and which is adapted to be easily and conveniently manipulated.

With this and other minor objects in view the invention consists of certain novel features of construction and combination of parts, which will be hereinafter more fully described and claimed.

In the accompanying drawings, Figure 1 is a perspective view of a pig-extractor embodying my invention, showing the hook folded or closed. Fig. 2 is a vertical longitudinal section of the same, showing the hook open for use.

Like reference characters designate corresponding parts throughout both views.

The numeral 1 in the drawings represents the tubular or cylindrical body of the device, provided at one end with a handle 2 for manipulating it and at the other end with an enlarged pear-shaped or tapering head 3. This head is formed with a horizontal slot 4, through which is adapted to project an extracting-hook 5, having an angular arm 6, pivoted to a transverse pin 7, mounted in the walls of said slot. The inner end of this arm projects through a slot or elongated aperture formed in the forward end of a rod 8, which passes through the body 1 and is attached to or provided at its outer end with a ring or other suitable handpiece 9. The hook is adapted to fold or close up into the slot, as shown in Fig. 1, and may be projected for use, as shown in Fig. 2, by drawing the handpiece 9 outwardly, and when so projected its inner end will abut against the inner wall of the tapering head 3, thus limiting the outwardly-swinging movement of the hook.

In use the head 3, with the hook folded up, is introduced to the required extent. The hand-ring is then drawn upon to project the hook, and by properly manipulating the tool the hook may be engaged with the jaw, ribs, or a part of the body of the pig and the pig extracted by drawing the device outwardly. By this means the pig may be easily and conveniently extracted with little or no injury thereto and without injury to the sow.

The device is simple in construction, easily operated, and may be manufactured at small cost.

Changes in the form, proportion, and minor details of construction may be made within the scope of the invention without departing from the spirit or sacrificing any of the advantages thereof.

Having thus fully described my invention, what I claim, and desire to secure by Letters Patent, is—

1. A veterinary surgical instrument comprising a tubular body provided at one end with a hand-grip and at the other end with a fixed or integral pear-shaped head formed at one side with a longitudinal slot, a transverse pivot-pin mounted in the walls of said slot, an extracting-hook pivotally mounted upon said pin to fold within the slot and to project outward therefrom, said hook having an arm adapted to bear upon the inner wall of the head and limit the outward movement of the hook, and an operating device extending through the tubular body and connected to said arm, substantially as set forth.

2. A veterinary surgical instrument comprising a tubular body provided at one end with a hand-grip and at the other end with a fixed or integral pear-shaped head formed at one side with a longitudinal slot, a transverse pivot-pin mounted in the walls of said slot, an extracting-hook pivotally mounted upon said pin to fold within the slot and to project outward therefrom, said hook having an arm adapted to bear upon the inner wall of the head and limit the outward movement of the hook, and an operating-rod extending through the tubular body, said rod being provided at its inner end with an elongated slot to receive said arm and at its outer end with a hand-piece, substantially as set forth.

In testimony whereof I have hereunto set my hand in presence of two subscribing witnesses.

G. T. MILLS.

Witnesses:
H. L. RESSEGUIN,
A. STUCKER.